J. M. MAY.
Gate.
No. 49,286.
2 Sheets—Sheet 1.
Patented Aug. 8, 1865.
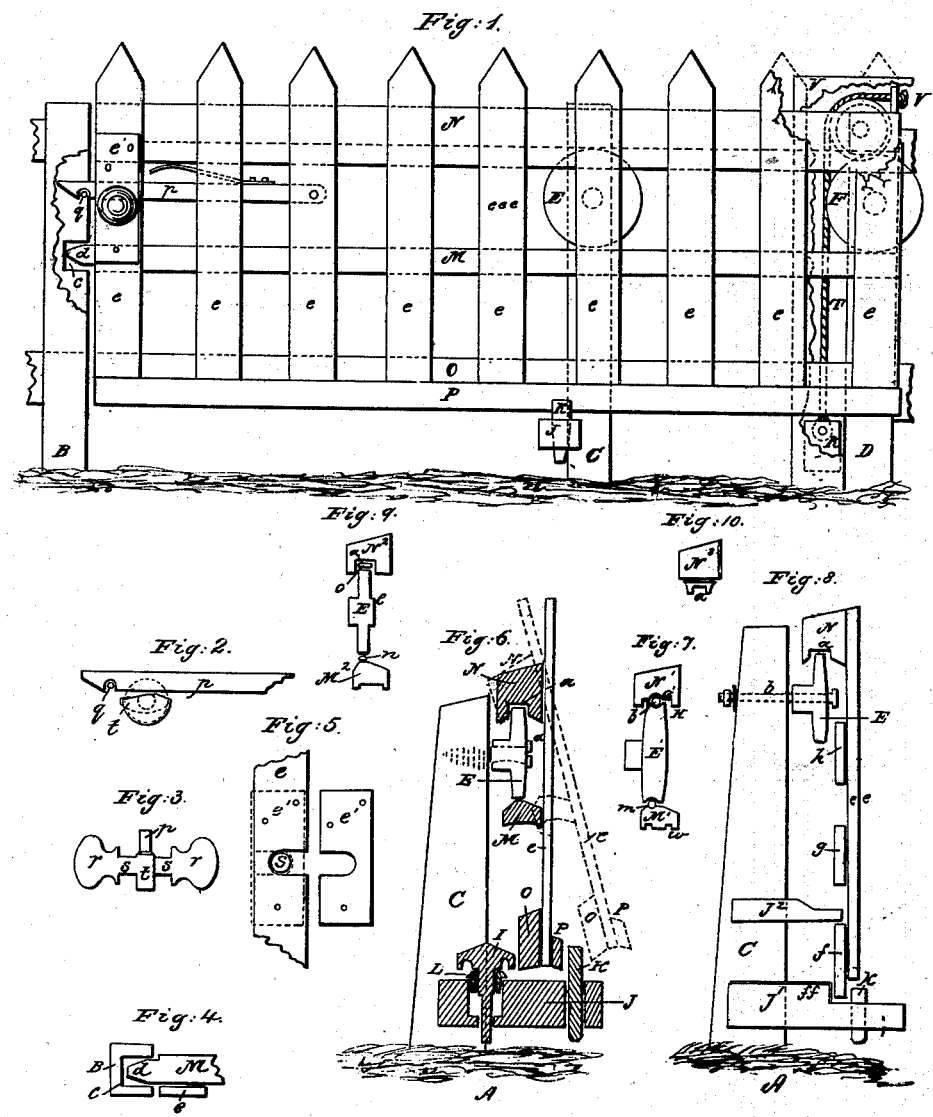
Witnesses:
H. Rulison
J. B. King
Inventor:
John M. May J. M. MAY.
Gate.
No. 49,286.
2 Sheets—Sheet 2.
Patented Aug. 8, 1865.
Fig. 11.
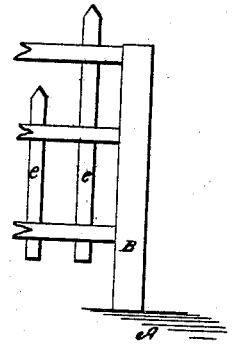
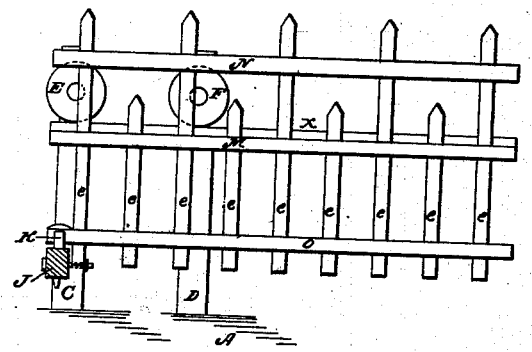
Fig. 12.
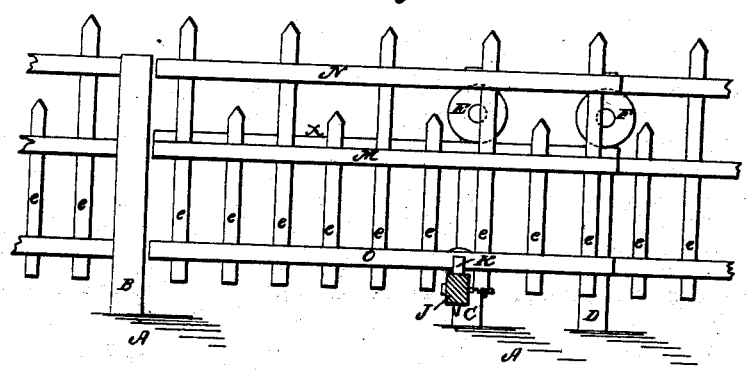
Fig. 13.
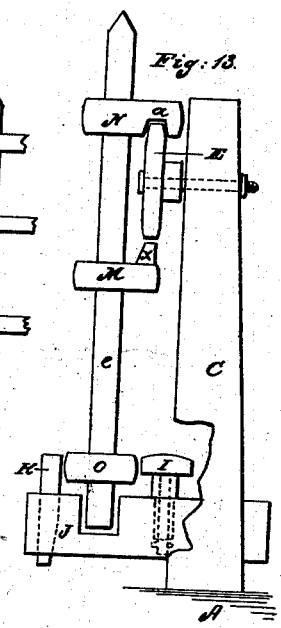
Fig. 14.
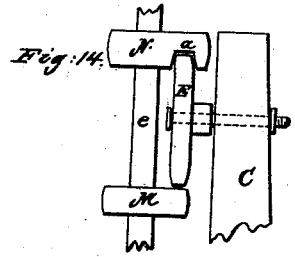
Witnesses:
C. E. Harwood
J. B. King
Inventor:
John M. May

UNITED STATES PATENT OFFICE.

JOHN M. MAY, OF JANESVILLE, WISCONSIN.

IMPROVEMENT IN GATES.

Specification forming part of Letters Patent No. 49,286, dated August 8, 1865.

*To all whom it may concern:*

Be it known that I, JOHN M. MAY, of the city of Janesville, Rock county, and State of Wisconsin, have invented a new and useful Improvement in Gates, and the mode of hanging them, for farm and other purposes; and I do declare that the following is a full, clear, and exact description thereof, reference being had to the accompanying drawings and letters of reference marked thereon.

My invention relates to that class of gates that run parallel with the line of the fence in opening and closing; and its nature consists, first, in constructing a gate with two rails, one directly above and one directly below the two wheels that are attached to the posts and sustain the gate as it is operated, whereby the gate need be only about one-third or one-fourth longer than the gateway, obviating the necessity of making the gate twice as long or more than twice as long as the gateway or of using a weight to balance the gate; second, in constructing a gate with a groove in the under side or under edge of a rail to serve the double purpose of a track and a guide for the wheels that support the gate as it is opened and closed, whereby the track is kept clear of snow, rain, and ice, or other obstructions; and, third, in closing a gate that runs parallel with the line of the fence by means of a weight and pulley.

In the accompanying drawings the same letters of reference in each figure represent the same part.

Figure 1 represents a gate ready for use, with a portion of one post and a portion of the gate broken away the better to show its construction. Fig. 2 is a vertical section showing part of a latch and a cam or tumbler for raising the latch as the knob is turned. Fig. 3 is a vertical cross-section of the knob, cam, and latch. Fig. 4 is a horizontal cross-section of a post and part of a rail of the gate and picket. Fig. 5 is a section showing a mode of forming a bearing in one of the pickets for the axes of the knobs and cam, when the cam, knobs, and axes are formed of one piece of material. Fig. 6 is a cross-section showing one wheel, the ends of the rails, the edge of one picket, (the knob and latch being removed,) one post, a friction-roller, and projection from the post cut through their centers, and the manner of hanging a gate on wheels and removing the gate. Fig. 7 is another mode of making wheels and rails. Fig. 8 is an end view of a cheap gate with one rail, boards lengthwise of the gate instead of pickets, the friction-roller being dispensed with. Fig. 9 is another modification of wheels and rails. Fig. 10 is yet another modification of a rail. Fig. 11 in Plate 2 of drawings is an elevation showing a gate opened. This gate is made with round or square pickets and with flat or broad rails. Fig. 12 is a view of the same gate closed, and with a part of pannels of fence in both directions from the gate. Fig. 13 is a cross-section of a gate with round or square pickets, showing a post, picket, wheel, and broad rails, the upper one with a groove to serve as a track and guide for the wheels between the rails. Fig. 14 is another cross-section, showing a modification of the lower track.

A in Figs. 1, 8, 12, and 13 represents the ground, in which is firmly set the posts B, C, and D, the posts C and D having attached to them wheels E and F by proper axes or journals to allow them to revolve freely as the gate is moved longitudinally, and supported and guided by the wheels between the rails M and N as the gate is projected across the passage-way between posts B and C, or rail N only is used, as seen in Fig. 8. The upper edge of the wheels travels in the channel $a$, on the under side of rail N, and on the upper edge or plane of rail M. These rails are placed parallel and far enough apart to allow the wheels to revolve freely between them, and when the gate is moved past its center in opening and closing it acts as a lever and the wheel nearest its center acts as a fulcrum; but the gate is kept in a horizontal position, or nearly so, by the counter action and reversed motion of the other wheel as it travels on the lower rail, or, in other words, this effect is produced as the inverted rail N travels on the upper edge and the rail M travels along the lower edge of the wheels.

The rail N on the first plate of drawings is the main support of the gate, and I call it an "inverted rail," the upper side or edge being formed in a roof-like manner to carry off rain, &c., to its side farthest from the picket $e$ in Figs. 1 and 6, or stiles $e\ e$ and boards $f$, $g$, and $h$ in Fig. 8; or it may be level on its upper surface; and the lower corner of this rail, as well as the lower corner of rail M, I prefer making as shown in Figs. 6 and 8, to facilitate the dripping of water as far as practicable from their traveled surfaces; or they may be made as shown in Figs. 7, 9, and 10. The upper rail of rail M, I also make roof-like, to be the more free from obstructions from ice and snow, for, though covered by rail N, driving storms may lodge some snow and ice thereon; but if the surface traveled by the wheels is narrow and on either side there is a declivity, obstructions are more readily pushed aside as the gate is moved.

The rail in Fig. 8 and the rail in Fig. 6 show wooden surfaces to be traveled by the wheels, while the wheel E' in Fig. 7 has a channel around its periphery to receive the round rods $l$ and $m$, which are properly fastened to rails M' and N', while $N^2$ in Fig. 9 has a bar, $o$, (an iron bar being deemed the best,) and rail $M^2$ has the bar $n$ for wheels $E^2$ to travel on, or there may be an independent channel, $a'$, attached to rail $N^3$, as shown in Fig. 10.

Figs. 1 and 6 show a picket-gate, the pickets $e$ being fastened to rails M N and base O, the surbase P being used to strengthen the lower edge of the gate, and particularly to make a plane surface for keeping the gate in line between the pin K and roller I.

Against the roller travels the base-board O of the gate. The gate being hung on wheels E and F slightly one side of its center of gravity, causes a slight pressure of the lower edge of the gate against the roller. The pin K on the opposite side of the roller keeps the gate guided freely, the surbase presenting a smooth surface for contact with the pin. By removing the pin the bottom of the gate may be swung out, as shown by red lines in Fig. 6, and the gate removed from the posts and wheels when desired.

Fig. 8 is a cross-section, and represents a plain board gate cut vertically at post C, and has but one rail, N, which forms the top of the gate.

The projection or pin $J^2$ extends from post C over the upper edge of the bottom board, $f$, but not so far as to interfere with stiles $e$ $e$ $e$, which pin keeps the gate from being lifted from the wheels. Should the end of projection $J^2$ be provided with a friction-roller and a corresponding one on D, they would serve substantially the same purpose as rail M in Fig. 1, so far as to keep the gate in its position horizontally as it is operated.

The second plate of drawings, Fig. 11, shows my gate opened and sustained by wheels E and F between rails N and M, the wheels being attached to posts C and D, while at the left of the gateway is post B and a section of fence. From post D the fence is extended in a right-hand direction. The gate serves as a fence between posts C and D.

It will be observed that the space for a gateway from B to C is twice or more than twice as great as the supporting-distance from C to D. Thus on my plan it requires only about one-fourth to one-third more length of gate than space for gateway, the gate being supported and guided by wheels E and F between rails N and M, as before described; but I do not confine myself to these proportions. The piece X, as shown in Figs. 11, 12, and 13, is placed on rail M for the lower track, with its narrow upper edge that comes in contact with the wheels, is easily kept from obstructions, and may readily be replaced when worn out.

Fig. 12 shows a gate closed and a section of fence at each end. Of course the fence must not be of the same description or style as the gate.

The enlarged cross-section, Fig. 13, is a post, C, and shows a gate with broad rails and round or square pickets $e$. The groove $a$ in the upper rail serves the double purpose of a track to support and a guide to keep in line the gate; also, shows piece X placed on the rail M for a track directly underneath the wheels, as well as friction-roller I, projection J, and pin K, the post C being broken away in order to show a friction-roller more clearly. This mode of hanging and operating a gate I also apply to doors and for analogous purposes.

A part of broad rail M in Fig. 14 serves as the lower track, the part X placed on rail M, as shown in Figs. 11, 12, and 13, that serves as a track, being omitted. I prefer the use of the part X, as it presents a better surface and is more easily replaced when worn.

I may state that the ordinary width of a farm-gateway is about ten or eleven feet, and to procure lumber for a gate twice or more than twice as long as the gateway is wide in order to balance the gate is often difficult. By my invention the usual lengths of lumber (fourteen to sixteen feet) used for fencing purposes is all that is required for the usual farm-gate. Also, groove $a$ serves as a guide for the wheels of a gate, and also the upper surface of the groove serves as a track to sustain the weight of the gate, instead of the groove serving only as a guide by receiving the flanges of wheels.

A gate that has the under or lower surface of the rail for a track (instead of the upper surface of a groove) to sustain the weight of a gate as it travels over the wheels is liable to injury and obstruction by the track becoming wet by rain dripping down the side of the rail and on its under surface that is used as a track, and in winter forming ice; and a stationary rail whose upper surface is used for a track for wheels that are attached to a gate to travel over is liable to the same objections; but by my invention the upper part of the groove being the track traveled by the wheels is always effectually protected from obstructions by rain, snow, or ice. Also, the use of two rails and two wheels, as herein described, obviates the necessity of using weights to balance a gate that is of less length than twice the width of the gateway.

I am aware that gates have been made with a groove on the under side of the rail, the groove serving only for the purpose of guiding the gate as it is moved longitudinally with the fence, the under surface of the rail being the track traveled by the wheels that support the gate, and the gate itself being twice or more than twice as long as the gateway is wide, as described in the patent issued to John Woodward October 28, 1862; and I do not claim, broadly, a groove, but only when a groove serves a double purpose—to wit, as a guide to keep the gate in line and its upper surface as a track for the wheels that sustain the gate.

I am also aware that gates have been made to project across the gateway when the gate itself is of less than double the width of the gateway, the projecting portion of the gate being balanced by a weight at the other end of the gate-frame, the wheels being attached to the gate and travel on the upper surface of a stationary rail, as described in the patent issued to Franklin F. Blood, dated December 15, 1863, and I do not claim, broadly, a gate that projects across the gateway.

I claim—

Friction-roller J, or its equivalent, in combination with grooved rail N, used in constructing a gate, and wheels E and F, used in operating a gate and for analogous purposes, when the whole are arranged and operated substantially as described.

JOHN M. MAY.

Witnesses:
S. L. LORD,
S. A. HUDSON.